United States Patent
Kang et al.

(10) Patent No.: US 11,407,892 B2
(45) Date of Patent: Aug. 9, 2022

(54) RESIN COMPOSITION FOR CAMERA MODULE HAVING EXCELLENT LASER TRANSMITTANCE AND CAMERA LENS MODULE MEMBER PRODUCED USING THE SAME

(71) Applicants: HYUNDAI MOBIS CO., LTD., Seoul (KR); KOLON PLASTICS, INC., Gimcheon-si (KR)

(72) Inventors: Hyoung Taek Kang, Yongin-si (KR); Keun Hyung Lee, Yongin-si (KR); Hyeon Don Kim, Yongin-si (KR); Seong Hyeon Myeong, Daegu (KR); Gi Bong Chung, Daegu (KR)

(73) Assignees: HYUNDAI MOBIS CO., LTD., Seoul (KR); KOLON PLASTICS, INC., Gimcheon-si (KR)

( * ) Notice: Subject to any disclaimer, the term of this patent is extended or adjusted under 35 U.S.C. 154(b) by 0 days.

(21) Appl. No.: 17/014,320

(22) Filed: Sep. 8, 2020

(65) Prior Publication Data
US 2021/0070985 A1    Mar. 11, 2021

(30) Foreign Application Priority Data
Sep. 10, 2019    (KR) .................. 10-2019-0112133

(51) Int. Cl.
| | | |
|---|---|---|
| *C08L 69/00* | (2006.01) | |
| *C08L 67/02* | (2006.01) | |
| *C08K 7/14* | (2006.01) | |
| *G03B 17/08* | (2021.01) | |
| *G03B 17/12* | (2021.01) | |
| *C08K 7/02* | (2006.01) | |

(52) U.S. Cl.
CPC .............. *C08L 69/00* (2013.01); *C08K 7/02* (2013.01); *C08K 7/14* (2013.01); *C08L 67/02* (2013.01); *G03B 17/08* (2013.01); *G03B 17/12* (2013.01)

(58) Field of Classification Search
None
See application file for complete search history.

(56) References Cited

U.S. PATENT DOCUMENTS

| | | | | |
|---|---|---|---|---|
| 2003/0068497 A1* | 4/2003 | Koshida | .............. | C08K 5/0041 428/411.1 |
| 2014/0191263 A1* | 7/2014 | Wang | .............. | C08L 67/02 257/98 |
| 2018/0171138 A1* | 6/2018 | Jung | .............. | C08L 67/02 |

FOREIGN PATENT DOCUMENTS

| | | | |
|---|---|---|---|
| CN | 103865246 | * | 6/2014 |
| JP | 2014139300 | * | 7/2014 |
| KR | 10-1993231 B1 | | 6/2019 |

* cited by examiner

*Primary Examiner* — David J Buttner
(74) *Attorney, Agent, or Firm* — DLA Piper LLP (US)

(57) ABSTRACT

The present disclosure is directed to a resin composition for a camera module having excellent laser transmittance and a camera module member produced using the same. In one embodiment, the resin composition for a camera module includes: 25 to 50 wt % of a polycarbonate resin; 5 to 30 wt % of a polycyclohexylenedimethylene terephthalate (PCT) resin; 30 to 50 wt % of a fibrous filler; and 0.001 to 5 wt % of a dye.

12 Claims, 4 Drawing Sheets

RESIN COMPOSITION FOR CAMERA MODULE HAVING EXCELLENT LASER TRANSMITTANCE AND CAMERA LENS MODULE MEMBER PRODUCED USING THE SAME

CROSS-REFERENCE TO RELATED APPLICATION

This application claims priority from and the benefit of Korean Patent Application No. 10-2019-0112133, filed on Sep. 10, 2019, which is hereby incorporated by reference for all purposes as if set forth herein.

BACKGROUND

Field

The present disclosure relates to a resin composition for a camera module having excellent laser transmittance, and a camera module member produced using the same. More particularly, the present disclosure relates to a resin composition for a camera module, which may be laser-welded due to excellent laser transmittance, and has excellent dimensional stability, and a camera module member produced using the same.

Discussion of the Background

It is very important to form a driving space so that a driver can accurately look at the front, left, right, and rear of a vehicle during driving, and to allow the driver to keep an eye on the adjacent position when stopping and parking the vehicle. To this end, a camera is installed in the interior or rear of the vehicle so that an invisible adjacent position can be sensed by the camera. In particular, the rear camera of the vehicle allows the driver to monitor the blind spot in the rear of the vehicle through a screen, thereby preventing an accident from occurring when the vehicle reverses and ensuring the safety of the occupant.

A camera module (or a camera lens module) installed in the vehicle requires reliability and stability as the most important properties, because a momentary malfunction of the camera module can have a fatal effect on the occupant's life. In addition, the camera module requires high water tightness together with operational stability under intense cold and intense heat conditions. In particular, a high-performance vehicular camera module having more than 1 million pixels, which has recently been installed, is necessarily required to have heat dissipation and electromagnetic shielding properties.

FIG. 1 is an exploded perspective view of a conventional camera module. Referring to FIG. 1, a camera module 100 includes a lens assembly and a housing. Referring to FIG. 1, the lens assembly includes a retainer 10, a plurality of lenses 20, spacers (not shown), an O-ring 30, and a barrel 40. Among them, the barrel 40 serves to accommodate the plurality of lenses, is required to have excellent dimensional stability, and is made mainly of an aluminum-based alloy or a polyphenylene sulfide resin composition. In addition, the O-ring is fastened to the outer circumferential surface of the lens assembly to improve water tightness between the lens assembly and the housing, and then an adhesive is applied to the lens assembly which is then assembled with a front body, thereby producing the camera module.

In addition, the housing of the camera module 100 includes a front body 50 and a rear body 90, and PCBs 60 and 62 are received in the housing. In the conventional housing, a gasket 80 is inserted between the front body 50 and the rear body 90, which are then assembled by fastening using screws 70. However, in recent years, bonding by laser welding has been used to ensure excellent water tightness and ease of assembly.

Meanwhile, a laser welding process can achieve high water tightness, bonding strength and the like after bonding and overcome quality problems by reducing burr or dust formation, compared to conventional methods such as ultrasonic welding, vibration welding and thermal welding. Thus, the laser welding process has attracted attention in the fields of manufacture of various parts.

The first basic component of laser welding is a laser, and a near infrared (NIR) laser beam is mainly used. As the near infrared laser beam, a semiconductor laser in a wavelength range of 800 to 1,100 nm is mainly used. The second basic component thereof is a material for transmitting the laser, which is mainly referred to as a laser-transmitting material. The laser-transmitting material is required to have a suitable laser transmittance depending on the required thickness of the product so that it transmits the laser in the above-described wavelength range. The third basic component thereof is a laser-absorbing material. The transmitted laser passes through the laser-transmitting material and meets a non-laser-transmitting material, thus causing bonding. An example of material with excellent laser absorptivity includes carbon black, and a pigment that absorbs the laser in the above-described wavelength range without transmitting the laser may be selected and used. Thus, for laser welding, the laser-transmitting material and the laser-absorbing material need to be prepared separately, and these materials are prepared from the same kind of materials to help improve bonding force and strength. In particular, in laser welding, it is important to improve the transmittance of the laser-transmitting material.

Basically, when a transparent resin material, for example, an amorphous resin such as polycarbonate (PC) and polymethyl methacrylate (PMMA), is used as the laser-transmitting material, the laser transmittance thereof is 90 to 100%, and thus the use thereof is not problematic. On the other hand, when a semi-crystalline resin such as polyamide (PA), polybutylene terephthalate (PBT) or polyoxymethylene (POM) is used for a part that requires heat resistance, chemical resistance and mechanical strength, it contains a crystalline region, and hence the laser transmittance thereof significantly decreases to 30% or less due to refraction and reflection of the laser during transmission.

Conventionally, when an amorphous resin such as polycarbonate was alloyed with a semi-crystalline resin to increase the transmittance of the semi-crystalline resin, the amorphous region could be increased, thus increasing the transmittance. However, in this case, the laser transmittance merely increases and an achievable level of laser bonding is merely realized, but a problem arises in that it is difficult to produce a material that can satisfy both excellent laser transmittance and bonding strength properties. In addition, the laser transmittance differs depending on the composition and thickness of the product, and the laser transmittance decreases as the thickness of the product increases. Thus, it can be considered that it is important to select a resin that satisfies the required properties of a product, and to ensure the laser transmittance depending on the thickness of the product.

In addition, in many cases, regardless of amorphous resin or crystalline resin, the product is produced to have a color (e.g., black color) similar to that of a laser-absorbing material. To this end, it is important that the laser-transmitting material is also produced using a special pigment so that it can transmit a laser in a colored state.

On the other hand, the laser-absorbing material is composed of either the same resin as that of the laser-transmitting material or a material having excellent compatibility with the laser-transmitting material in order to prevent a difference in strength between the materials after bonding. When the same or similar materials are bonded by laser welding, it is possible to achieve high strength, and when the content of a fibrous filler or a mineral filler increases and the content of resin relatively decreases, the strength after laser bonding is reduced. For this reason, it is important to appropriately select materials and compositions in terms of achieving bonding strength. In addition, unlike the laser-transmitting material, the laser-absorbing material needs to have a laser transmittance close to 0% at the relevant wavelength so that it does not transmit a laser. To achieve this transmittance, it is necessary to further use additives such as carbon black and a pigment, which can absorb the laser without transmitting and reflecting the laser at the relevant wavelength.

As described above, the laser, the laser-transmitting material and the laser-absorbing material, which are required for laser welding, have been examined, whereby a product can be produced by a laser welding process. However, when the laser welding process is applied to a specific product, additional material requirements are required. Specifically, the laser-transmitting material and laser-absorbing material required for laser welding are bonded after they are injection-molded into a laser-transmitting layer and a laser-absorbing layer, respectively. For this reason, when a crystalline resin is used, problems may arise in that dimensions change due to molding shrinkage, and deformation occurs due to fiber orientation when a fibrous filler is contained. In addition, a problem may also arise in that dimensions change due to a change in external temperature. Therefore, there is increasing demand for materials having such dimensional stability.

Examples of resins capable of satisfying the relevant properties include polycarbonate (PC). Polycarbonate is an amorphous resin and has advantages in that the laser transmission properties and dimensional stability thereof are excellent, the glass transition temperature (Tg) thereof is high, and thus the dimensional change caused by an external temperature change from low temperature to high temperature is less. On the other hand, polycarbonate has a disadvantage of low chemical resistance, and hence when the polycarbonate is applied to a vehicle or a product which is exposed to outdoor environments, it can undergo color change and physical property degradation by chemicals. Thus, methods capable of overcoming this disadvantage may be contemplated. As one of these methods, a method of alloying a semi-crystalline resin having high chemical resistance with the polycarbonate may be considered. Usually, the semi-crystalline resin has excellent mechanical properties, heat resistance and chemical resistance properties, but has disadvantages such as a low glass transition temperature, a significant dimensional change caused by crystallization, and high molding shrinkage. It can be considered that the most suitable semi-crystalline resin capable of being alloyed with the polycarbonate is polyester.

Conventionally, technology of alloying polybutylene terephthalate (PBT) or polyethylene terephthalate (PET) with polycarbonate (PC) or a product obtained by the technology has been most generally used. PBT or PET has excellent chemical resistance, but the glass transition temperature (Tg) thereof is low at 50° C. to 60° C. For this reason, when PBT or PET is contained in a certain amount or more, it disadvantageously lowers the Tg of the polycarbonate, causing dimensional changes at high temperature. Polyester has excellent electrical properties and low hygroscopic properties, but has a disadvantage of low thermal properties, compared to polyamide.

Meanwhile, polycyclohexylenedimethylene terephthalate (PCT) resin has a melting temperature (Tm) of about 280° C. to 295° C. and a glass transition temperature (Tg) of about 89° C. to 92° C., which are lower than those of PBT or PET. Thus, the PCT resin is considered suitable for being alloyed with PC and used for this purpose.

Accordingly, there is a need to develop a resin composition, which exhibits excellent laser transmission properties suitable for the laser welding process, has low molding shrinkage, low-deformation properties, and low dimensional changes with temperature changes, and thus may exhibit properties suitable for precision parts for laser welding. In particular, the present disclosure intends to provide an alloy-based resin composition, which exhibits a higher laser transmittance than a conventional laser-transmitting material and has dimensional stability and chemical resistance properties.

Background art related to the present disclosure is disclosed in Korean Patent No. 10-1993231 (published on Jun. 26, 2019; entitled "Mineral Filler-Containing Resin Composition for Camera Barrel Having Enhanced Impact Resistance").

SUMMARY

An object of the present disclosure is to provide a resin composition for a camera module having excellent laser transmittance, mechanical strength and dimensional stability.

Another object of the present disclosure is to provide a resin composition for a camera module having excellent bonding strength with a base material after laser welding, and also having excellent water tightness and water pressure resistance.

Still another object of the present disclosure is to provide a resin composition for a camera module having excellent appearance, chemical resistance, moisture resistance and weather resistance.

Yet another object of the present disclosure is to provide a resin composition for a camera module having excellent miscibility, flowability and moldability.

Still yet another object of the present disclosure is to provide a camera module member produced using the resin composition for a camera module.

One aspect of the present disclosure is directed to a resin composition for a camera module. In one embodiment, the resin composition for a camera module includes: 25 to 50 wt % of a polycarbonate resin; 5 to 30 wt % of a polycyclohexylenedimethylene terephthalate (PCT) resin; 30 to 50 wt % of a fibrous filler; and 0.001 to 5 wt % of a dye.

In one embodiment, the polycarbonate resin may have a viscosity-average molecular weight (Mv) of 15,000 to 35,000.

In one embodiment, the PCT resin may have an intrinsic viscosity of 0.6 to 0.8 dl/g.

In one embodiment, the fibrous filler may include one or more of glass fiber, carbon fiber, silica fiber, potassium titanate fiber, titanium fiber, aramid fiber, and asbestos fiber.

In one embodiment, the fibrous filler may have an average diameter of 3 to 15 μm and an average length of 0.05 to 5 mm.

In one embodiment, the resin composition for a camera module may further include one or more of a nucleating agent, a release agent, a compatibilizer, an antioxidant, an impact modifier, and an ultraviolet absorber.

In one embodiment, the PCT resin and the fibrous filler may be included at a weight ratio of 1:1 to 1:5.

In one embodiment, the resin composition for a camera module may have a Charpy notched impact strength of 12 kJ/m$^2$ or more as measured for a 4-mm-thick specimen in accordance with the ISO 180 standard (23° C.), and a laser transmittance of 80% or more as measured for a 2-mm-thick specimen at a wavelength of 980 nm.

In one embodiment, a specimen including a bonding portion having a size of 1.5 mm×60 mm×2.0 mm, formed by laser-welding the resin composition for a camera module and a laser-absorbing member at a wavelength of 980 nm, may have a bonding strength of 2,500 N or more as measured at a speed of 50 mm/min using a UTM device.

In one embodiment, the resin composition for a camera module may have a molding shrinkage rate of 0.5% or less as measured in accordance with the ISO 294-4 standard, a linear thermal expansion coefficient of 40 to 50 (μm/m·° C.) as measured at a temperature ranging from −40 to 100° C. in accordance with the ISO 11359 standard, and an average linear thermal expansion coefficient (an average of MD and TD values) of 25 to 60 as measured at a temperature ranging from −40 to 100° C. in accordance with the ISO 11359 standard.

In one embodiment, the resin composition for a camera module may have a flexural strength of 190 MPa or more and a flexural modulus of 9,000 MPa or more, as measured in accordance with the ISO 178 standard.

Another aspect of the present disclosure is directed to a camera module member produced using the resin composition for a camera module.

In one embodiment, the camera module member may be a barrel or a rear body.

The resin composition for a camera module according to the present disclosure and a camera module member produced using the same have excellent laser transmittance, mechanical strength, and dimensional stability. In addition, the resin composition and the camera module member have excellent bonding strength with a base material after laser welding, water tightness, and water pressure resistance. Furthermore, the resin composition and the camera module member have excellent appearance, chemical resistance, moisture resistance, weather resistance. In addition, the composition has excellent miscibility, flowability and moldability. Thus, the resin composition and the camera module member may be particularly suitable for use as a camera barrel for a vehicle, which requires high dimensional stability.

DETAILED DESCRIPTION OF THE ILLUSTRATED EMBODIMENTS

Figure 1:
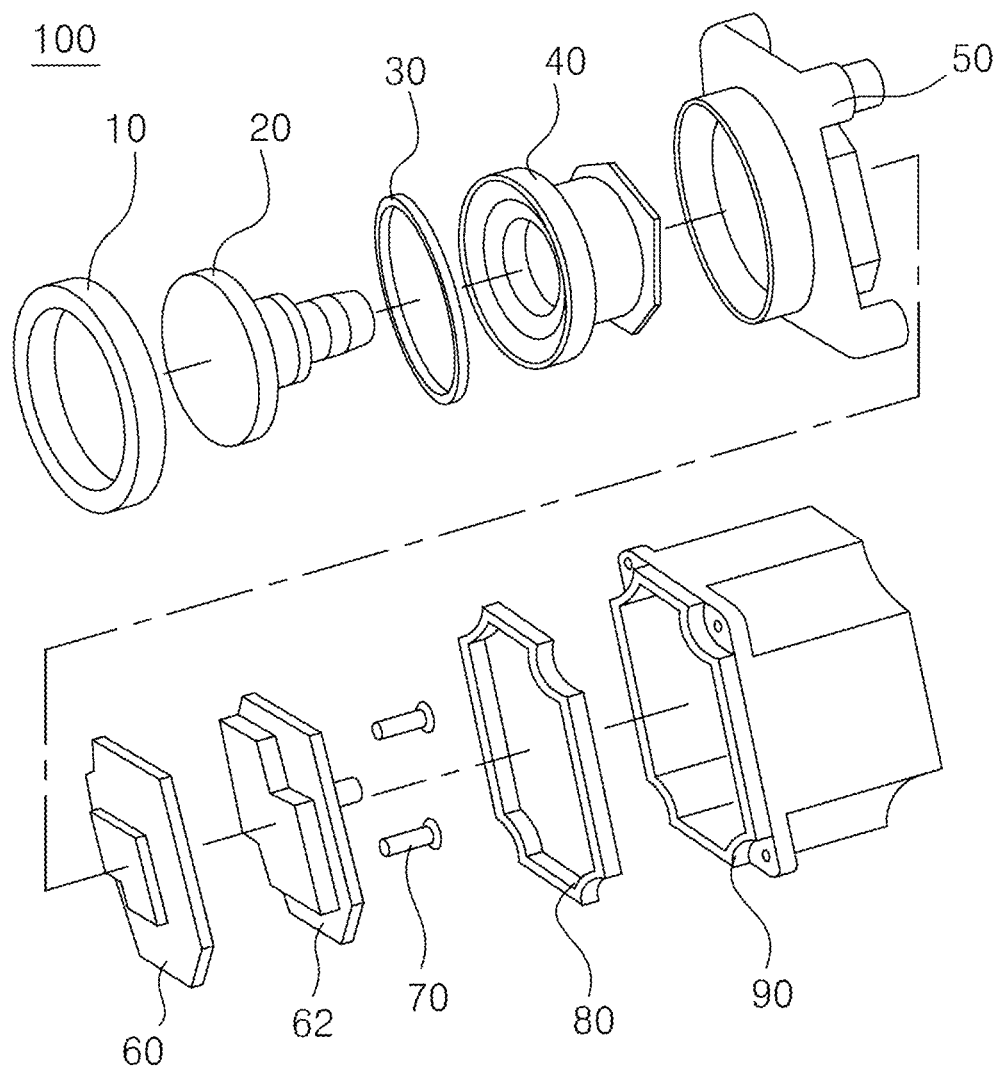
FIG. 1 is an exploded perspective view of a conventional camera module.

In the following description, the detailed description of related known technology or configuration will be omitted when it may unnecessarily obscure the subject matter of the present disclosure.

In addition, the terms used in the following description are terms defined taking into consideration the functions obtained in accordance with embodiments of the present disclosure, and may be changed in accordance with the option of a user or operator or practice. Accordingly, the definition of the terms should be made based on the contents throughout the present specification.

Resin Composition for Camera Module

One aspect of the present disclosure is directed to a resin composition for a camera module. In one embodiment, the composition for a camera module includes: 25 to 50 wt % of a polycarbonate resin; 5 to 30 wt % of a polycyclohexylenedimethylene terephthalate (PCT) resin; 30 to 50 wt % of a fibrous filler; and 0.001 to 5 wt % of a dye.

Hereinafter, the resin composition for a camera module according to the present disclosure will be described in more detail.

Polycarbonate Resin

The polycarbonate (PC) resin that is used in the present disclosure may be an aromatic polycarbonate resin which is produced by reacting a diphenol (aromatic diol compound) with a carbonate precursor such as phosgene, halogen formate or carbonic acid diester.

In one embodiment, the diphenol may include one or more of 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, and 2,2-bis(3,5-dimethyl-4-hydroxyphenyl)propane. For example, 2,2-bis(4-hydroxyphenyl)propane called bisphenol-A may be used as the diphenol.

In one embodiment, the carbonate precursor may include one or more of dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, carbonyl chloride (phosgene), diphosgene, triphosgene, carbonyl bromide, and bishaloformate.

In one embodiment, the polycarbonate resin may have a viscosity-average molecular weight (Mv) of 15,000 to 35,000. If the viscosity-average molecular weight of the polycarbonate resin is less than 15,000, the impact strength of the resin composition may be reduced, and if the viscosity-average molecular weight thereof is more than 35,000, the flowability of the resin composition may be reduced.

In one embodiment, the viscosity-average molecular weight may be determined by dissolving a polycarbonate pellet in methylene chloride, measuring the intrinsic viscosity [η] of the obtained solution at 20° C. using an Ubbelohde-type viscometer, and then calculating the viscosity-average molecular weight according to the following equation 1 (Schnell viscosity equation):

$$[\eta]=1.23\times10^{-5}\times(Mv)^{0.83} \qquad \text{[Equation 1]}$$

In one embodiment, the polycarbonate resin is included in an amount of 25 to 50 wt % based on the total weight of the resin composition for a camera module. If the polycarbonate resin is included in an amount of less than 25 wt %, it may be difficult to ensure the dimensional stability of the composition, and if the polycarbonate resin is included in an amount of more than 50 wt %, the chemical resistance of the composition may be reduced. For example, the polycarbonate resin may be included in an amount of 30 to 50 wt %. For example, the polycarbonate resin may be included in an amount of 25, 26, 27, 28, 29, 30, 31, 32, 33, 34, 35, 36, 37, 38, 39, 40, 41, 42, 43, 44, 45, 46, 47, 48, 49 or 50 wt % based on the total weight of the resin composition for a camera module.

Polycyclohexylenedimethylene Terephthalate Resin

In one embodiment, the polycyclohexylenedimethylene terephthalate (PCT) resin may be produced either by direct esterification between terephthalic acid and 1,4-cyclohexanedimethanol (CHDM) as monomers, or by polycondensation of dimethyl terephthalate and cyclohexanedimethanol by transesterification.

In one embodiment, the PCT resin may have an intrinsic viscosity of 0.6 to 0.8 dl/g. If the intrinsic viscosity of the PCT resin is less than 0.6 dl/g, the overall mechanical properties of the resin composition of the present disclosure may be degraded and the flowability of the resin composition may excessively increase, and if the intrinsic viscosity thereof is more than 0.8 dl/g, processing during injection molding may be difficult due to reduced flowability resulting from the high viscosity. In one embodiment, the intrinsic viscosity ($\eta$) may be determined by dissolving a PCT resin sample in methylene chloride and measuring the intrinsic solution of the obtained solution at 20° C. using an Ubbelohde-type viscometer. For example, the PCT resin may have an intrinsic viscosity of 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79 or 0.8 dl/g.

In one embodiment, the PCT resin is included in an amount of 5 to 30 wt % based on the total weight of the resin composition for a camera module. If the PCT resin is included in an amount of less than 5 wt %, it may be difficult to improve the chemical resistance of the polycarbonate resin, and if the PCT resin is included in an amount of more than 30 wt %, the glass transition temperature (Tg) of the composition may be lowered and the linear expansion coefficient thereof may increase, resulting in a decrease in dimensional stability with temperature changes. For example, the PCT resin may be included in an amount of 10 to 30 wt %. For example, the PCT resin may be included in an amount of 5, 6, 7, 8, 9, 10, 11, 12, 13, 14, 15, 16, 17, 18, 19, 20, 21, 22, 23, 24, 25, 26, 27, 28, 29 or 30 wt % based on the total weight of the resin composition for a camera module.

Fibrous Filler

The fibrous filler may serve to improve the mechanical strength and heat resistance of the resin composition and ensure excellent dimensional stability thereof even under high-temperature conditions.

In one embodiment, the fibrous filler may include one or more of glass fiber, carbon fiber, silica fiber, potassium titanate fiber, titanium fiber, aramid fiber, and asbestos fiber.

In one embodiment, the fibrous filler may have a circular or elliptical cross-section. In one embodiment, the fibrous filler may have an average (nominal) diameter of 3 to 15 µm and an average (nominal) length (chop length) of 0.05 to 5 mm. Under such conditions, the dimensional stability and mechanical strength of the resin composition may be excellent while the miscibility and moldability thereof may be excellent.

In one embodiment, the fibrous filler may be surface-treated with a coupling agent. As the coupling agent, there may be used a silane-based compound having an organic functional group such as a vinyl group, an epoxy group, a mercaptan group or an amino group.

In one embodiment, the fibrous filler is included in an amount of 30 to 50 wt % based on the total weight of the resin composition for a camera module. If the fibrous filler is included in an amount of less than 30 wt %, the mechanical properties targeted by the present disclosure may not be reached, and the dimensional stability may be reduced, and if the fibrous filler is included in an amount of more than 50 wt %, the mechanical properties of the composition may be improved, but the surface properties thereof may be degraded and the flowability thereof may decrease, resulting in molding defects. For example, the fibrous filler may be included in an amount of 25, 26, 27, 28, 29, 30, 31, 32, 33, 34, 35, 36, 37, 38, 39, 40, 41, 42, 43, 44, 45, 46, 47, 48, 49 or 50 wt % based on the total weight of the resin composition for a camera module.

In one embodiment, the PCT resin and the fibrous filler may be included at a weight ratio of 1:1 to 1:5. At this weight ratio, the laser transmittance, dimensional stability and mechanical properties of the composition may be excellent while the miscibility and dispersibility thereof may be excellent. For example, the PCT resin and the fibrous filler may be included at a weight ratio of 1:3 to 1:5.

Dye

The dye of the present disclosure not only should have a coloring effect but also should not affect the changes in the laser transmittance, mechanical properties and glass transition temperature of the composition. Conventional vehicular parts have a black color, mainly achieved using carbon black. However, when carbon black is contained in a laser-transmitting material, it absorbs the laser wavelength. Thus, when even a trace amount of carbon black is contained, it lowers the laser transmittance of the material, making laser welding impossible. Accordingly, a dye or pigment other than carbon black should be used to achieve the required black color, but the pigment is unsuitable for use in the composition of the present disclosure because it displays a color by reflecting light.

However, the dye may be used in the composition of the present disclosure, because it displays a color by absorbing light only in a specific wavelength range and transmits light in another specific wavelength range.

In addition, a black dye may be used in the present disclosure. However, there are only few types of black dyes, and the black dyes have the property of absorbing light in a laser transmission wavelength range (=a wavelength range in which laser welding is performed).

Accordingly, in the present disclosure, a black color may be realized by combining several colors among dyes capable of transmitting light in a laser transmission wavelength range (near infrared rays).

In one embodiment, examples of the dye that may be used in the present disclosure include anthraquinone-based dyes, azo-based dyes, phthalocyanine-based dyes, methine-based dyes, oxazine-based dyes, and metal complex dyes thereof.

In one embodiment, the dye may include one or more of Solvent Brown 53 and Solvent Blue 122. When the dye is included, it may achieve a black color and may not degrade the transmittance properties and mechanical properties of the base resin.

In one embodiment, the dye is included in an amount of 0.001 to 5 wt % based on the total weight of the resin composition for a camera module. If the dye is included in an amount of less than 0.001 wt %, it may be difficult to achieve a black color, and if the dye is included in an amount of more than 5 wt %, the effect of adding the dye in an increased amount may be negligible and the production cost may merely increase. For example, the dye may be included in an amount of 0.01 to 0.05 wt %. For example, the dye may be included in an amount of 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or 5 wt % based on the total weight of the resin composition for a camera module.

The resin composition for a camera module according to the present disclosure may further include an additive depending on the required properties thereof. In one embodiment, the additive may include one or more of an antioxidant, a light stabilizer, a release agent, a compatibilizer, and a nucleating agent.

In one embodiment, the antioxidant may include one or more of phenol-type, phosphite-type, thioether-type and amine-type antioxidants. In one embodiment, the antioxidant may be included in an amount of 0.001 to 5 wt % based on the total weight of the resin composition for a camera module. When the antioxidant is included in an amount within this range, the composition may have excellent weather resistance. For example, the antioxidant may be included in an amount of 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or 5 wt % based on the total weight of the resin composition for a camera module.

In one embodiment, the light stabilizer may include one or more of a benzotriazole-based stabilizer, a sebacate HALS-based stabilizer, a triazine-based stabilizer, a benzophenol-based stabilizer, and an amine-based stabilizer. In one embodiment, the light stabilizer may be included in an amount of 0.001 to 5 wt % based on the total weight of the resin composition for a camera module. When the light stabilizer is included in an amount within this range, the composition may have excellent weather resistance and yellowing resistance. For example, the light stabilizer may be included in an amount of 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or 5 wt % based on the total weight of the resin composition for a camera module.

In one embodiment, the release agent may include one or more of a fluorine-containing polymer, silicone oil, a metal salt of stearic acid, a metal salt of montanic acid, montanic acid ester wax, and polyethylene wax. In one embodiment, the release agent may be included in an amount of 0.001 to 5 wt % based on the total weight of the resin composition for a camera module. When the release agent is included in an amount within this range, the releasability of the composition may be excellent while the laser transmittance thereof is not reduced. For example, the release agent may be included in an amount of 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or 5 wt % based on the total weight of the resin composition for a camera module.

In one embodiment, the compatibilizer may include one or more of styrene-glycidyl methacrylate, styrene-acrylonitrile-glycidyl methacrylate, ethylene-methacrylate-glycidyl methacrylate, styrene-maleic anhydride, and styrene-acrylonitrile-maleic anhydride. In one embodiment, the compatibilizer may be included in an amount of 0.001 to 5 wt % based on the total weight of the resin composition for a camera module. When the compatibilzier is included in an amount within this range, the miscibility and dispersibility of the components of the composition may be excellent while the laser transmittance of the composition is not reduced.

In one embodiment, the nucleating agent may include one or more of Wollastonite, talc, mica, silica, and clay. In one embodiment, the nucleating agent may be included in an amount of 0.001 to 5 wt % based on the total weight of the resin composition for a camera module. When the nucleating agent is included in an amount within this range, the crystallization rate of the composition may be controlled in an excellent manner while the laser transmittance thereof is not reduced. For example, the nucleating agent may be included in an amount of 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or 5 wt % based on the total weight of the resin composition for a camera module.

In one embodiment, the resin composition for a camera module may have a Charpy notched impact strength of 12 kJ/m$^2$ or more as measured for a 4-mm-thick specimen in accordance with the ISO 180 standard (23° C.), and a laser transmittance of 80% or more as measured for a 2-mm-thick specimen at a wavelength of 980 nm using a laser transmittance system (manufactured by EVLaser Co. Ltd., model: ETM-30).

For example, the resin composition for a camera module may have a Charpy notched impact strength of 12 to 25 kJ/m$^2$ as measured for a 4-mm-thick specimen in accordance with the ISO 180 standard (23° C.), and a laser transmittance of 80 to 99.999% as measured for a 2-mm-thick specimen at a wavelength of 980 nm.

In one embodiment, a specimen including a bonding portion having a size of 1.5 mm×60 mm×2.0 mm, formed by laser-welding the resin composition for a camera module with a laser-absorbing member at a wavelength of 980 nm using a laser system (ELPW-E100, EVLaser Co. Ltd.), may have a bonding strength (or maximum load value) of 2,500 N or more as measured at a speed of 50 mm/min in accordance with the MS216-06 standard of Hyundai-Kia Motor Company using a UTM device (Instron model 3367). For example, the bonding strength may be 2,700 to 3,500 N.

The laser-absorbing member may be formed using a laser-absorbing composition including 0.001 to 5 wt % of carbon black. For example, the laser-absorbing member may be formed using a laser-absorbing composition including 25 to 50 wt % of a polycarbonate resin, 5 to 30 wt % of a polycyclohexylenedimethylene terephthalate (PCT) resin, 30 to 50 wt % of a fibrous filler, and 0.001 to 5 wt % of carbon black.

In one embodiment, the resin composition for a camera module may have a molding shrinkage of 0.5% or less as measured in accordance with the ISO 294-4 standard. For example, the resin composition for a camera module may have molding shrinkage rates in machine direction (MD) and transverse direction (TD) of 0.2 to 0.4% and 0.3 to 0.5%, respectively, as measured for a 60 mm×60 mm×2 mm specimen in accordance with the ISO 294-4 standard.

In one embodiment, the resin composition for a camera module may have a linear thermal expansion coefficient of 40 to 50 (μm/m·° C.) as measured at a temperature ranging from −40 to 100° C. in accordance with the ISO 11359 standard, and an average linear thermal expansion coefficient (an average of MD and TD values) of 25 to 60 as measured at a temperature ranging from −40 to 100° C. in accordance with the ISO 11359 standard.

In one embodiment, the resin composition for a camera module may have a linear expansion coefficient in transverse direction (TD) of 40 to 90 (×10⁻⁶/° C.) as measured at a temperature ranging from −40 to 100° C. in accordance with the ISO 11359 standard.

In one embodiment, the resin composition for a camera module may have a linear thermal expansion coefficient in machine direction (MD) of 10 to 40 (μm/m·° C.) as measured at a temperature ranging from −40 to 100° C. in accordance with the ISO 11359 standard.

In one embodiment, the resin composition for a camera module may have a flexural strength of 190 MPa or more and a flexural modulus of 9,000 MPa or more, as measured in accordance with the ISO 178 standard. For example, the resin composition for a camera module may have a flexural strength of 190 to 240 MPa and a flexural modulus of 9,000 to 12,500 MPa, as measured in accordance with the ISO 178 standard.

In one embodiment, the resin composition for a camera module may not be cracked even after a 20% sodium hydroxide aqueous solution, ethanol and acetic acid are sprayed onto a specimen, fixed to an ESCR jig, once a day for three days.

Method for Producing Resin Composition for Camera Module

In one embodiment, the resin composition for a camera module may be produced by mixing the above-described components in the above-described amounts using various mixers, melt-kneading the mixture by a Banbury mixer, a roll, a single-screw extruder, a twin-screw extruder or a kneader to obtain a pellet-type composition, and then injection-molding the pellet-type composition.

For example, the resin composition for a camera module may be produced by kneading at 270 to 290° C. using a twin-screw extruder as a mixer, in order to maximize kneading of the components. In addition, residence time may be minimized to prevent thermal decomposition of the composition during melt kneading. In one embodiment, the optimum screw rotation speed may be determined in consideration of the dispersibility of the composition. For example, kneading may be performed at a rotational speed of 200 to 400 rpm.

Camera Module Member Produced Using Resin Composition for Camera Module

Another object of the present disclosure is directed to a camera module member produced using the resin composition for a camera module. In one embodiment, the camera module member may be a barrel or a rear body.

Figure 2:
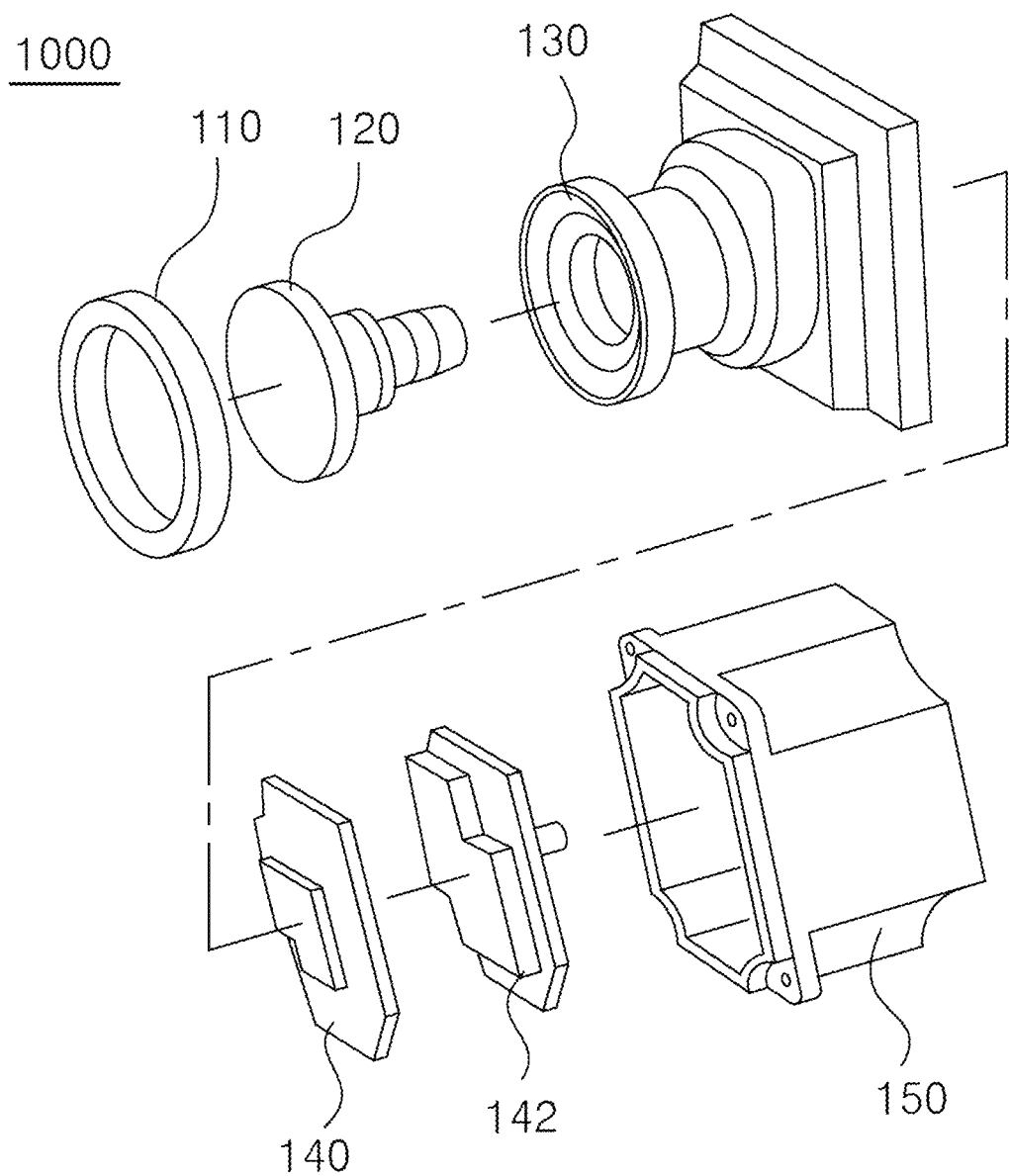
FIG. 2 is an exploded perspective view of a camera module according to an embodiment of the present disclosure.
Figure 3:
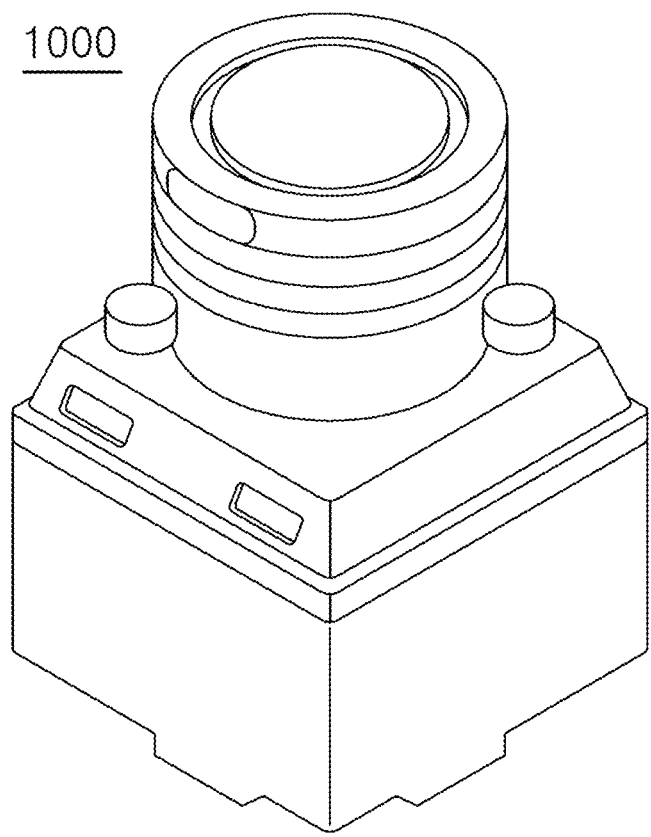
FIG. 3 illustrates a camera module according to an embodiment of the present disclosure.

FIG. 2 is an exploded perspective view of a camera module according to the present disclosure, and FIG. 3 illustrates a camera module according to one embodiment of the present disclosure. Referring to FIGS. 2 and 3, a barrel 130 of the present disclosure may be produced as an integral structure including a barrel and front cover of a conventional module. In addition, the barrel 130 or rear body 140 produced according to the present disclosure may be bonded by laser welding. Thus, it is possible to omit parts, including an O-ring, a front cover and screws, which are used in a conventional camera module. Furthermore, the barrel 130 or the rear body 140 has excellent water tightness and bonding strength after laser welding, and may exhibit excellent productivity and economic efficiency by achieving process simplification.

Hereinafter, the configuration and effect of the present disclosure will be described in more detail with reference to preferred examples. However, these examples are presented as preferred examples of the present disclosure and shall not be construed as limiting the scope of the present disclosure in any way. The contents that are not described herein can be sufficiently and technically envisioned by those skilled in the art, and thus the description thereof will be omitted herein.

EXAMPLES AND COMPARATIVE EXAMPLES

The components used in Examples and Comparative Examples are as follows.

(A) Polycarbonate resin: 3022P3 (Samyang Corp., Korea) was used.

(B) Polycyclohexylenedimethylene terephthalate (PCT) resin: SKYPURA 3302 (SK Chemical Co., Ltd) was used.

(C) Fibrous filler: Glass fiber (KCC Co., Ltd., 321) was used.

(D1) Solvent Brown 53 (Polysynthren Brown R, Clariant) was used as a dye. (D2) Solvent Blue 122 (Polysynthren Blue R, Clariant) was used as a dye. (D3) Carbon black (Hiblack 50L, Orion Co., Ltd.) was used.

(E1) Antioxidant: Irganox1010 (BASF) was used. (E2) Release agent: Licowax OP (Clariant) was used. (E3) Light stabilizer: Tinuvin234 (BASF) was used.

Examples 1 to 6 and Comparative Examples 1 to 7

According to the compositions shown in Table 1 below, components were melt-kneaded in a twin-screw extruder heated to a temperature of 270 to 290° C., and then chip-type resin compositions for a camera module were produced from the melt-kneaded mixtures, and then dried in a dehumidifying dryer at 80° C. for 5 hours.

TABLE 1

| Components (wt %) | (A) | (B) | (C) | (D1) | (D2) | (D3) | (E1) | (E2) | (E3) |
|---|---|---|---|---|---|---|---|---|---|
| Example 1 | 39 | 19.86 | 40 | 0.02 | 0.02 | — | 0.3 | 0.3 | 0.5 |
| Example 2 | 49 | 9.86 | 40 | 0.02 | 0.02 | — | 0.3 | 0.3 | 0.5 |
| Example 3 | 29 | 29.86 | 40 | 0.02 | 0.02 | — | 0.3 | 0.3 | 0.5 |
| Example 4 | 39 | 24.86 | 35 | 0.02 | 0.02 | — | 0.3 | 0.3 | 0.5 |
| Example 5 | 34 | 19.86 | 45 | 0.02 | 0.02 | — | 0.3 | 0.3 | 0.5 |
| Example 6 | 29 | 29.82 | 40 | 0.04 | 0.04 | — | 0.3 | 0.3 | 0.5 |
| Comparative Example 1 | 29.4 | 29.3 | 40 | — | — | 0.2 | 0.3 | 0.3 | 0.5 |
| Comparative Example 2 | 58.86 | — | 40 | 0.02 | 0.02 | — | 0.3 | 0.3 | 0.5 |
| Comparative Example 3 | — | 58.86 | 40 | 0.02 | 0.02 | — | 0.3 | 0.3 | 0.5 |
| Comparative Example 4 | 54 | 4.86 | 40 | 0.02 | 0.02 | — | 0.3 | 0.3 | 0.5 |
| Comparative Example 5 | 19 | 39.86 | 40 | 0.02 | 0.02 | — | 0.3 | 0.3 | 0.5 |
| Comparative Example 6 | 10 | 48.86 | 40 | 0.02 | 0.02 | — | 0.3 | 0.3 | 0.5 |
| Comparative Example 7 | 49 | 29.86 | 20 | 0.02 | 0.02 | — | 0.3 | 0.3 | 0.5 |

Test Example (1)

For the resin composition specimens for camera modules, produced in the Examples and the Comparative Examples, the impact strength, laser transmittance, chemical resistance, molding shrinkage rate and linear expansion coefficient of each specimen were measured according to the methods described below, and the results of the measurement are shown in Table 2 below.

(1) Impact strength (kJ/m$^2$): In accordance with the ISO 180 standard, 4-mm-thick specimens of the Examples and the Comparative Examples were prepared, and the Charpy notched impact strength of each of the specimens was measured at room temperature (23° C.).

(2) Laser transmittance (%): Laser transmittance was measured using a laser transmittance measurement system (EVLaser Co., Ltd., model: ETM-30) under the following conditions: a laser type of diode laser, a wavelength of 980 nm, and a set power of 10 MW. Each of the measured specimens of the Examples and the Comparative Examples had a size of 60 mm×60 mm and a thickness of 2 mm, the laser transmittances of the corners and midpoint of each of the injection-molded sheet-shaped specimens were measured and averaged. In general, under the above conditions and at the above specimen thickness, the minimum transmittance at which laser welding is possible is about 30%. When laser welding is performed at a transmittance of less than 30%, the bonding time and power are increased, and it is difficult to achieve sufficient bonding strength.

(3) Chemical resistance: For each of the Examples and the Comparative Examples, a ⅛-inch dumbbell-shaped specimen was prepared, and fixed to an ESCR (Environmental Stress Cracking Resistance) jig with a strain of 1%, and then a 20% sodium hydroxide aqueous solution, ethanol and acetic acid were sprayed onto each specimen once a day for 3 days. Next, whether the specimen was cracked was observed.

(4) Molding shrinkage rate (%): In accordance with the ISO 294-4 standard, the molding shrinkage rate of each of the specimens of the Examples and the Comparative Examples, each having a size of 60 mm×60 mm and a thickness of 2 mm, was measured. The molding shrinkage rate was measured in the injection gate direction according to glass fiber orientation as the MD direction and in the right-angled surface as the TD direction, and five measurements were averaged. The size ($T_1$) that decreased compared to the existing mold size (60×60 mm) was substituted into the existing size ($T_0$), and the molding shrinkage rate was calculated according to the following equation 2:

$$\text{Molding shrinkage rate (\%)} = [((T_0 - T_1)/T_0) \times 100] \quad \text{Equation 2}$$

In general, in the injection molding industry, although the relevant numerical value may be expressed as a shrinkage rate of 1% based on 100%, it is generally expressed as 10/1000 instead of 1%.

(5) Linear thermal expansion coefficient (linear expansion coefficient) (μm/m·° C.): In accordance with the ISO 11359 standard, the linear thermal expansion coefficient of each of the specimens of the Examples and Comparative Examples, each having a size of 5 mm×5 mm and a thickness of 5 mm, was measured. The linear thermal expansion coefficient was measured in the transverse direction (TD) while heating each specimen from −40° C. to 100° C. at a heating rate of 5° C./min under a load of 0.05 N, and the dimensional change compared to the initial measured value was measured.

TABLE 2

| | Impact strength (kJ/m$^2$) | Laser transmittance (%) | Chemical resistance | | | Molding shrinkage rate (%) | Linear expansion coefficient (μm/m · ° C.) |
|---|---|---|---|---|---|---|---|
| | | | NaOH | Ethanol | Acetic acid | | |
| Example 1 | 14.5 | 90.5 | Not cracked | Not cracked | Not cracked | 0.31 to 0.41 | 43.5 to 45.5 |
| Example 2 | 15.1 | 94.6 | Not cracked | Not cracked | Not cracked | 0.28 to 0.35 | 42.3 to 44.4 |
| Example 3 | 13.6 | 92.7 | Not cracked | Not cracked | Not cracked | 0.35 to 0.44 | 44.0 to 46.1 |
| Example 4 | 12.3 | 95.1 | Not cracked | Not cracked | Not cracked | 0.39 to 0.48 | 45.3 to 47.6 |
| Example 5 | 15.6 | 85.6 | Not cracked | Not cracked | Not cracked | 0.30 to 0.39 | 41.3 to 43.8 |
| Example 6 | 14.2 | 92.5 | Not cracked | Not cracked | Not cracked | 0.36 to 0.44 | 44.1 to 46.0 |
| Comparative Example 1 | 13.5 | 10.1 | Not cracked | Not cracked | Not cracked | 0.36 to 0.45 | 43.8 to 46.2 |
| Comparative Example 2 | 18.2 | 96.8 | Cracked | Not cracked | Not cracked | 0.21 to 0.36 | 38.8 to 41.1 |
| Comparative Example 3 | 10.1 | 46.2 | Not cracked | Not cracked | Not cracked | 0.42 to 1.08 | 53.5 to 102.5 |
| Comparative Example 4 | 17.1 | 96 | Cracked | Not cracked | Not cracked | 0.28 to 0.34 | 42.1 to 44.5 |
| Comparative Example 5 | 11.1 | 90.3 | Not cracked | Not cracked | Not cracked | 0.46 to 0.60 | 49.5 to 63.1 |
| Comparative Example 6 | 13.8 | 95.8 | Not cracked | Not cracked | Not cracked | 0.51 to 0.72 | 49.8 to 73.3 |
| Comparative Example 7 | 11.9 | 96.9 | Not cracked | Not cracked | Not cracked | 0.45 to 0.70 | 71.1 to 84.5 |

Referring to the results in Table 2 above, it could be seen that Examples 1 to 6 of the present disclosure had excellent laser transmittance and also had impact resistance and dimensional stability. On the other hand, it could be seen that Comparative Example 1, in which carbon black was applied instead of the dye of the present disclosure, could not be laser-welded due to the reduced laser transmittance thereof, Comparative Examples 2 and 3, which do not include one of the components of the composition of the present disclosure, had reduced impact strength, chemical resistance and laser transmittance, and Comparative Examples 4 to 7, which do not satisfy the content range of each component of the composition of the present disclosure, had reduced impact strength, chemical resistance and dimensional stability.

Comparative Examples 8 to 12

Comparative Example 8

A resin composition was produced in the same manner as in Example 1, except that polyphenylene sulfide (PPS) resin was applied instead of the polycarbonate resin.

Comparative 9

A resin composition was produced in the same manner as in Example 1, except that polyphthalamide (PPA) resin was applied instead of the polycarbonate resin.

Comparative 10

A resin composition was produced in the same manner as in Example 1, except that polyamide 12 (PA12) resin was applied instead of the polycarbonate resin.

Comparative 11

A resin composition was produced in the same manner as in Example 1, except that polyamide 66 (PA66) resin was applied instead of the polycarbonate resin Comparative 12

A resin composition was produced in the same manner as in Example 1, except that a blend of polybutylene terephthalate resin and polyethylene terephthalate resin was applied instead of the polycarbonate resin.

Test Example (2)

Using each of the resin compositions for camera modules produced in Examples 1 and 6 and Comparative Examples 8 to 12, camera module members (barrel and rear body) were produced.

The physical properties of the camera module members were evaluated according to the methods described below, and the results of the evaluation are shown in Table 3 below.

(1) Bonding strength (N): Bonding strength was measured in accordance with the MS216-06 standard of Hyundai-Kia Motor Company. Specifically, a specimen including a bonding portion having a size of 1.5 mm×60 mm×2.0 mm was formed by laser-welding each resin composition specimen for a camera module with a laser-absorbing member at a wavelength of 980 nm using a laser system (ELPW-E100, EVLaser Co., Ltd.), and the bonding strength of the specimen was measured at a speed of 50 mm/min using a UTM device (Instron model 3367). The laser-absorbing member was produced using the components and their contents of each of Examples 1 and 6 and Comparative Examples 8 to 12, except that carbon black was used instead of the dye.

(2) Laser transmittance (%): Laser transmittance was measured in the same manner as in Test Example 1.

(3) Dimensional stability (%): For each shrinkage specimen (60 mm (width)×60 mm (length)×2 mm (thickness)), the dimensional change rate between before and after evaluation of moisture resistance (at 50° C. and 95% RH for 240 hours) was measured. Specifically, before and after the moisture resistance of the specimen was evaluated, the change rate in each of the MD and TD directions was calculated, and then the calculated values were averaged.

(4) Average linear thermal expansion coefficient (average linear expansion coefficient): In accordance with the ISO 11359 standard, each specimen having a size of 5 mm×5 mm and a thickness of 5 mm was prepared and evaluated. The average linear expansion coefficient was determined by averaging the dimensional changes compared to the initial dimensions, measured in the machine direction (MD) and the transverse direction (TD) while heating each specimen from −40° C. to 100° C. at a heating rate of 5° C./min under a load of 0.05 N.

(5) Pressure resistance: Pressure resistance was evaluated by immersing each specimen, prepared for measurement of the bonding strength, in a water bath, applying a pressure of 1 to 6 bar to the specimen for 20 seconds, and then checking whether bubbles (leakage) occurred at the laser-welded portion.

TABLE 3

| | Bonding strength (N) | Laser transmittance (%) | Dimensional stability (%) | Average linear expansion coefficient | Pressure resistance (occurrence of leakage) |
| --- | --- | --- | --- | --- | --- |
| Example 1 | 2,703 | 90.5 | 0.06 | 42 | No leakage occurred |
| Example 6 | 3,208 | 92.5 | 0.05 | 56 | No leakage occurred |
| Comparative Example 8 | 1,500 | 22 | 0.05 | 48 | — |
| Comparative Example 9 | 3,022 | 16 | 0.22 | 28 | NG (3 bar leak) |
| Comparative Example 10 | 2,803 | 17 | 0.27 | 36 | — |

TABLE 3-continued

| | Bonding strength (N) | Laser transmittance (%) | Dimensional stability (%) | Average linear expansion coefficient | Pressure resistance (occurrence of leakage) |
|---|---|---|---|---|---|
| Comparative Example 11 | 2,252 | 60 | 0.44 | 39 | — |
| Comparative Example 12 | 2,790 | 40 | 0.21 | 75 | — |

Figure 4:
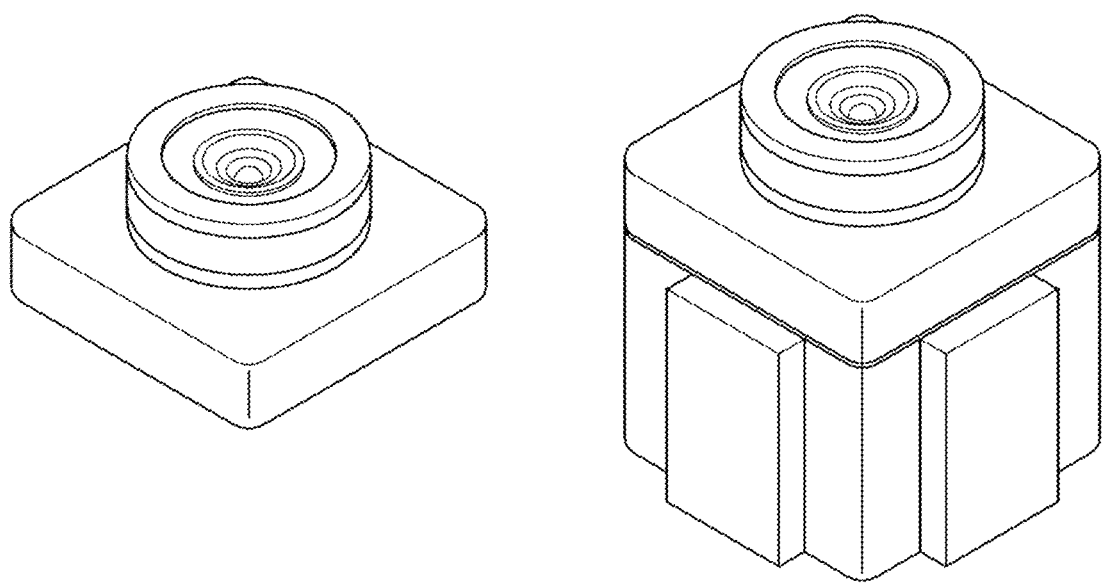
FIG. 4 depicts photographs of a camera module according to Example 1.

FIG. 4 shows photographs of the camera module of Example 1. Referring to the results in Table 3 above, it could be seen that, in the case of Comparative Examples 8 to 12 in which resins different from that of the present disclosure were applied, the bonding strength was low or the laser transmittance was low, and thus laser welding was possible only when the specimens are irradiated with high energy of 80 to 100 W, and furthermore, the efficiency of laser welding was low and the dimensional stability or water tightness was low.

Simple modifications or variations of the present disclosure may be easily carried out by those skilled in the art, and all such modifications or variations can be considered included in the scope of the present disclosure.

What is claimed is:

1. A resin composition for a camera module comprising:
   25 to 50 wt % of a polycarbonate resin;
   5 to 30 wt % of a polycyclohexylenedimethylene terephthalate (PCT) resin;
   30 to 50 wt % of a fibrous filler having a circular or elliptical cross-section; and
   0.01 to 5 wt % of a dye,
   wherein the PCT resin and the fibrous filler are included at a weight ratio of 1:3 to 1:5.

2. The resin composition of claim 1, wherein the polycarbonate resin has a viscosity-average molecular weight (Mv) of 15,000 to 35,000.

3. The resin composition of claim 1, wherein the PCT resin has an intrinsic viscosity of 0.6 to 0.8 dl/g.

4. The resin composition of claim 1, wherein the fibrous filler comprises one or more of glass fiber, carbon fiber, silica fiber, potassium titanate fiber, titanium fiber, aramid fiber, and asbestos fiber.

5. The resin composition of claim 1, wherein the fibrous filler has an average diameter of 3 to 15 μm and an average length of 0.05 to 5 mm.

6. The resin composition of claim 1, further comprising one or more of a nucleating agent, a release agent, a compatibilizer, an antioxidant, an impact modifier, and an ultraviolet absorber.

7. The resin composition of claim 1, which has a Charpy notched impact strength of 12 kJ/m$^2$ or more as measured for a 4-mm-thick specimen in accordance with ISO 180 standard (23° C.), and a laser transmittance of 80% or more as measured for a 2-mm-thick specimen at a wavelength of 980 nm.

8. The resin composition of claim 1, wherein a specimen comprising a bonding portion having a size of 1.5 mm×60 mm×2.0 mm, formed by laser-welding the resin composition for a camera module with a laser-absorbing member at a wavelength of 980 nm, has a bonding strength (or maximum load value) of 2,500 N or more as measured at a speed of 50 mm/min using a UTM device.

9. The resin composition of claim 1, which has a molding shrinkage rate of 0.5% or less as measured in accordance with ISO 294-4 standard, a linear thermal expansion coefficient of 40 to 50 (μm/m ° C.) as measured at a temperature ranging from −40 to 100° C. in accordance with ISO 11359 standard, and an average linear thermal expansion coefficient (an average of MD and TD values) of 25 to 60 as measured at a temperature ranging from −40 to 100° C. in accordance with ISO 11359 standard.

10. The resin composition of claim 1, which has a flexural strength of 190 MPa or more and a flexural modulus of 9,000 MPa or more, as measured in accordance with the ISO 178 standard.

11. A camera module member produced using the resin composition for a camera module according to claim 1.

12. The camera module member of claim 11, which is a barrel or a rear body.

* * * * *